April 14, 1970     B. L. ROSENTHAL     3,506,170
COAT SLEEVE SPREADER
Filed Jan. 22, 1969
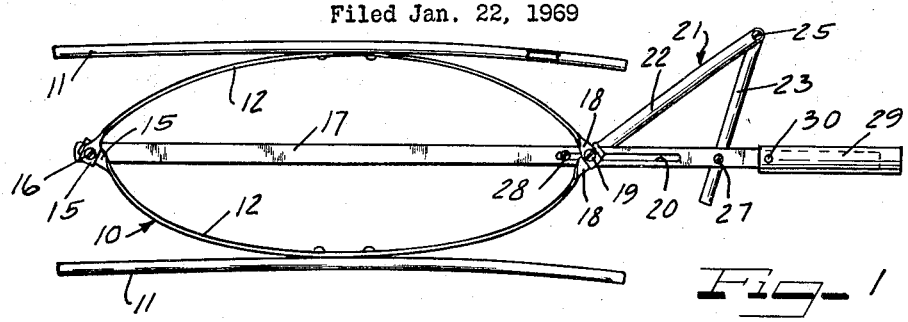
Fig. 1
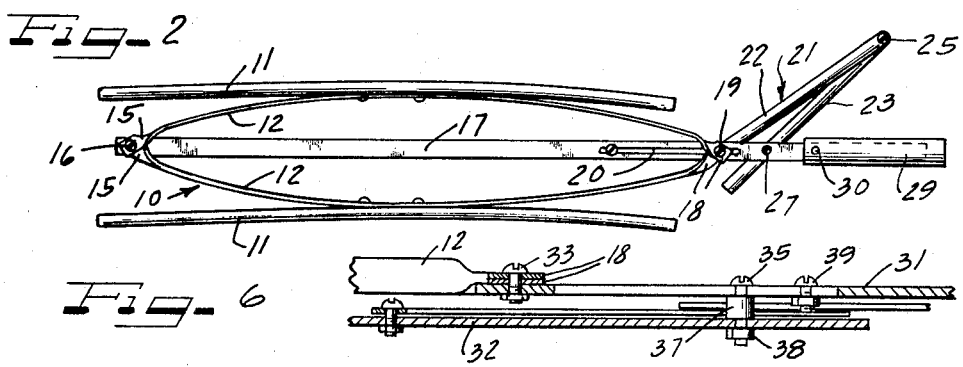
Fig. 2
Fig. 6
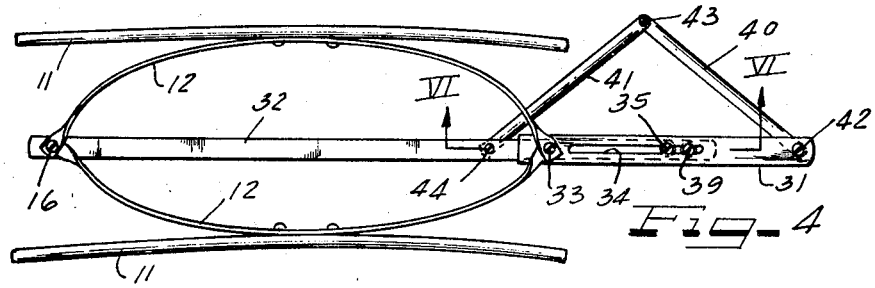
Fig. 4
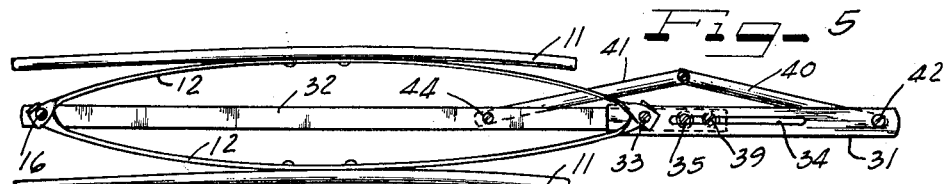
Fig. 5
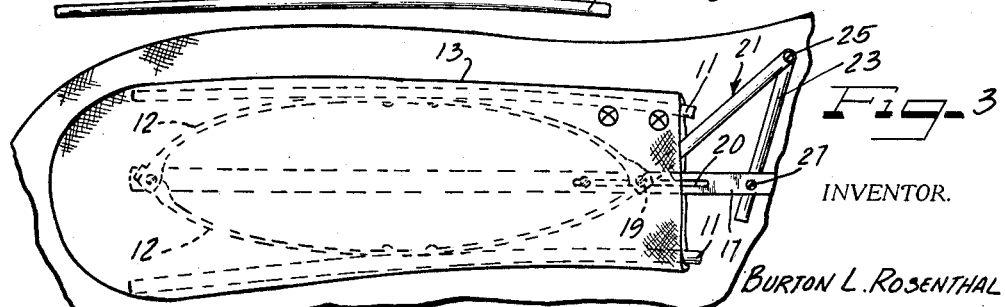
Fig. 3
INVENTOR.
BURTON L. ROSENTHAL
BY *Hill, Sherman, Meroni, Gross & Simpson*
ATTORNEYS United States Patent Office 3,506,170
Patented Apr. 14, 1970

3,506,170
COAT SLEEVE SPREADER
Burton L. Rosenthal, 3707 W. North Shore,
Lincolnwood, Ill. 60045
Filed Jan. 22, 1969, Ser. No. 793,074
Int. Cl. D06c *15/00, 5/00*
U.S. Cl. 223—72                                      10 Claims

ABSTRACT OF THE DISCLOSURE

Sleeve shaping device in the form of two elongated sleeve spreader strips of a relatively resilient material which may readily be inserted in and conformed to the sleeve by the stored up energy of two bowed springs. The bowed springs are pivotally connected together at their opposite ends and form mountings for the strips along their convex surfaces. An elongated stretch bar forms a mounting at its inner end for a pivot, pivotally connecting the springs together at one end and forms a slidable mounting for a second pivot connecting the springs together at their opposite ends. A lever pivoted to the stretch bar and to the second pivot elongates the springs and contracts the spreader strips, and is releasable to accomodate the stored up energy of the springs to force the spreader strips into engagement with the sleeve, to shape the sleeve and remove wrinkles from the sleeve upon the application of steam and hot air thereto.

BACKGROUND OF THE INVENTION

Coat sleeve spreaders commonly called sleevers, are used in dry cleaning plants with steam-air finishers in which the coat or jacket is draped and clamped over a form. Air is then used to inflate an inner bag, to expand the form and steam is introduced to remove most of the wrinkles and press the garment. Air then cools and dries the garment. The finisher, however, has no provisions for pressing and removing wrinkles from the sleeves. In order to do this, sleeve spreaders have been provided in the form of two connected bowed flat springs having rigid wooden strips connected thereto at each side thereof. The springs and strips are contracted by the hand and inserted in the sleeve and allowed to expand by the stored up energy in the spring. This requires two hands to contract the springs and spreader strips and in many cases requires one person to contract the spreader strips and a second person to hold the sleeve so the spreader strips may be inserted in position within the sleeve. This operation is time consuming and difficult. It is further difficult to remove the sleeve spreader due to the non-resiliency of the spreader strips and the fact that the sleeve spreader cannot readily be slipped from the sleeve, without first compressing the springs and then removing the spreader strips from the sleeve. Such devices also have a relatively short life and due to this and the difficulty in inserting and removing the sleeve spreader and the frequent tearing of the lining from the sleeve when removing the sleever, are not practical for universal use.

SUMMARY AND OBJECTS OF THE INVENTION

The sleeve spreader of the present invention is arranged to overcome the foregoing difficutlies by so constructing the spreader that it may readily be contracted by the use of a single hand and inserted in or removed from a sleeve and be manually collapsed prior to removal from the sleeve, providing a simpler, more easily operable sleeve spreader of a rugged construction which will give a relatively long life and will not tear or disrupt the lining of the sleeve.

A principal object of the present invention, therefore, is to provide a novel and improved form of sleeve spreader so arranged as to be contracted by the use of a single hand for both inserting in and withdrawing from a coat sleeve.

Another object of the invention is to provide a new and improved form of sleeve spreader having sleeve spreading strips engaging and spreading the sleeve and made from a relatively resilient material, to readily conform to the sleeve shape of a garment and thereby giving a better press and slipping into and out of the sleeve without disturbing the lining and the press on the cuff of the sleeve.

Still another object of the invention is to improve upon the sleeve spreaders heretofore in use by utilizing relatively resilient spreader strip biased to conform to the sleeve by the stored up energy of the springs of the spreader, and made from a plastic material having a surface which will readily slip into and out of a coat sleeve and conform to the form of the sleeve.

Still another object of the invention is to provide a novel and improved form of sleeve spreader operable by the use of one hand by a simplified form of lever means, for contracting the spreader strips prior to inserting the spreader into a sleeve and removing the spreader from the sleeve.

These and other objects of the invention will appear from time to time as the following specification proceeds and with reference to the accompanying drawings.

DESCRIPTION OF THE DRAWINGS

FIGURE 1 is a view in side elevation of a coat sleeve spreader constructed in accordance with the principles of the present invention, showing the spreader strips in extreme extended positions.

FIGURE 2 is a view of the coat sleeve spreader shown in FIGURE 1 showing the spreader strips in extreme contracted positions.

FIGURE 3 is a view showing the spreader in the sleeve of a coat.

FIGURE 4 is a view in side elevation illustrating a modified form in which the invention may be embodied.

FIGURE 5 is a view of the coat sleeve spreader of FIGURE 4, showing the spreader in an extreme contracted position; and FIGURE 6 is a detail partial fragmentary sectional view taken along line VI—VI of FIGURE 4, illustrating certain details not shown in FIGURE 4.

Description of the preferred embodiments of the invention

In the embodiment of the invention illustrated in FIGURES 1 and 2 of the drawings, I have shown a coat sleeve spreader or sleeve pressing and shaping device 10, including a pair of laterally spaced sleeve spreader strips 11, 11 riveted or otherwise secured to the convex sides of a pair of bowed springs 12, 12, pivotally connected together at their free ends to form in effect an elongated elliptical leaf spring.

As shown in FIGURES 1, 2 and 3, the ends of the leaf springs 12, 12 which will be adjacent the inner end of a sleeve 13 of a coat, have flattened end portions 15, 15 turned at right angles to the planes of the springs proper and pivotally connected together as by a machine screw 16, extending through said flattened end portions and through an elongated stretch bar 17 and suitably secured to said stretch bar. A washer or sleeve (not shown) extending along the machine screw 16 may space the flattened ends 15, 15 of the bowed springs 12 from the stretch bar 17. The stretch bar 17 extends for the length of said leaf springs and outwardly beyond said springs, so as to be accessible from the outside of the sleeve when it is desired to remove the sleeve spreader from the sleeve (FIGURE 3). The opposite ends of the leaf springs 12, 12 have flattened end portions 18, 18 pivotally connected together by a machine screw 19. Said machine screw extends through a slot 20 extending along the stretch bar 17 adjacent the outer end portion thereof, for slidable movement along said slot, to accommodate compression of said leaf springs by operation of a hand lever arrangement 21, as will hereinafter more clearly appear as this specification proceeds. A sleeve or washer (not shown) spaces the flattened ends 18 of the bowed springs 12, 12 from the bar 17 for slidable movement along said bar. The sleeve (not shown) may be made from nylon or a like material.

The hand lever arrangement includes a link 22 pivoted to the machine screw 19 and extending angularly outwardly therefrom. Said link 22 is pivoted at its outer end to a lever arm 23 on a pivot pin 25. The lever arm 23 is shown as pivoted to the stretch bar 17 on the outside of the slot 20 on a pivot pin 27. A stop screw 28 adjustably mounted in the slot 20 is provided to limit expansion of the bowed springs 12, 12. A handle 29, which may be in the form of plastic tubing closed at its outer end extends along the outside of the stretch bar 17 and is riveted thereto as by a rivet 30.

When it is desired to collapse the spreader strips 11, 11 the hand may grasp the handle 29 and link 22 and pivot the lever arm 23 toward said handle 29. This will extend or compress the bowed spring 12, 12 and bring the spreader strips 11 inwardly toward the stretch bar 17 to accommodate the insertion of the sleeve spreader within the sleeve of oa coat and the ready removal of the sleeve spreader from the sleeve of a coat without disturbing the lining of the sleeve.

It will be seen from FIGURE 3 that when the sleeve spreader is inserted in the sleeve of a coat in the contracted condition shown in FIGURE 2, and the link 22 is released, the stored up energy of the bowed springs 12, 12 will force the spreader strips into engagement with the sleeve of the coat and conform the spreader strips to the sleeve and spread the sleeve and remove wrinkles therefrom when retained in the coat sleeve, upon the application of steam and hot air to the sleeve.

Upon removing the sleeve spreader from the coat sleeve, the spreader strips 11, 11 are contracted by grasping the handle 29 and link 22 to move the pin or machine screw 19 outwardly along the slot 20 and bring the spreader strips 11, 11 inwardly toward each other.

While the spreader strips 11, 11 may be made from wood or any other suitable material, they are preferably made from plastic material having sufficient resiliency to conform to the sleeve of the coat and are tubular in form although they need not necesarily be tubular. One form of plastic which has been found satisfactory is a chlorinated polyvinyl chloride designated by the trade name CPVC. Another form of suitable material is polypropylene.

By using a lightweight plastic material having a relatively smooth surface for the spreader strips 11, 11, which will withstand the heat of the steam and hot air during the pressing and shaping operations and which has sufficient resiliency to conform to the sleeve of a coat, the spreader strips 11, 11 biased into engagement with the inside of the sleeve of the coat by the bowed springs 12, 12 will readily conform to the sleeve and may readily slip into and out of a coat sleeve without disturbing the lining of the sleeve or the press on the cuff.

While wood may be used in certain instances, wood does not have the resiliency to conform to the inside of the sleeve, and is likely to splinter and tear the lining of the sleeve after repeated usage.

Another suitable material which may advantageously be used is a spring steel proportioned in cross-section to readily conform to the sleeve of the coat.

In the form of the invention illustrated in FIGURES 4, 5 and 6, the spreader strips, bowed springs and means for connecting the bowed springs together at their free ends are the same as in the form of the invention illustrated in FIGURES 1 and 2, so the same part numbers will be applied to the same parts as in FIGURES 1 and 2. In this form of the invention a slide 31 is slidably mounted on the outer end of a stretch bar 32. The free ends of the bowed springs 12, 12 are pivotally connected to said slide 31, as by a machine screw or rivet 33. As shown in these figures, the stretch bar 32 has a pin 35 in the form of a machine screw mounted thereon in spaced relation with respect to the outer end thereof and extending through a slot 34 extending along the slide 31. The pin 35 has a spacer sleeve 37 thereon disposed between the slide 31 and stretch bar 32 and held thereto as by a nut 38 on the outer side of said stretch bar. The spacer sleeve 37 may be made from a plastic material having lubricating properties so as to form a bearing and spacer for the undersurface of the slide 31. A machine screw and nut 39 may extend through and be tightened in the slot 34 to accommodate adjustment of the length of said slot. A lever 40 is pivoted to the outer end of the slide 31 as by a rivet or pivot pin 42 and is pivotally connected to a link 41 at its opposite end, as by a pivot pin 43. The link 41 extends angularly inwardly or rearwardly of the pivot pin 43 and is pivotally connected at its inner end to the stretch bar 32 as by a pivot pin 44.

It may readily be seen that when the lever 40, link 41 and slide 31 are grasped by the hand and said link and lever are moved toward the stretch bar 32, the stretch bar 32 will be extended relative to the slide 31 to extend or compress the bowed springs 12, 12 and contract the spreader strips 11, 11. The sleeve spreader may then be readily inserted within a coat sleeve to spread the coat sleeve by the stored up energy of the bowed springs 12, 12, and may be compressed to accommodate ready removal of the coat sleeve spreader from the coat sleeve with a minimum of effort, without wrinkling or damaging the lining of the sleeve.

It should be understood that in operation of the device, the bowed springs 12, 12 are extended or compressed by the use of a single hand to bring the spreader strips 11, 11 towards each other, to accommodate the ready insertion of the spreader strips 11, 11 into a coat sleeve. When the sleeve spreader is in the sleeve of a coat, steam from the steam air finisher (not shown) may be turned on and envelope the garment and sleeve in steam for a short interval. Hot air may then be applied to the garment and sleeve to dry and cool the garment. The sleeve spreader may then be slipped from the sleeve without damaging the lining, by contracting the bowed springs 12, 12, by the use of a single hand on the outside of the sleeve.

It may further be seen that by the use of resilient spreader strips, such as plastic strips or tubes, the strips may be conformed to the shape of the sleeve by the stored up energy of the bowed springs 12, 12 to more efficiently shape the sleeve and provide a more rugged and easier operating coat sleeve spreader, of an improved and simplified construction.

While I have herein shown and described one form in which the invention may be embodied, it may readily be understood that various variations and modifications in the invention may be attained without departing from the spirit and scope of the novel concepts thereof.

I claim as my invention:
1. A sleeve spreader and shaper comprising:
 a pair of elongated bowed springs pivotally connected together at their adjacent ends and bowed in opposite directions relative to each other,
 a pair of elongated resilient sleeve conforming spreader strips secured intermediate their ends to said bowed springs intermediate the ends of said springs and extending therealong,
 said spreader strips being made from a resilient plastic material having sufficient resiliency to conform to different sleeve sizes and conformations when engaged with the interior of the sleeve by said bowed springs, and said bowed springs being manually contractible to accommodate ready insertion and removal of said spreader strips from the sleeve, and being extensible to accommodate said bowed springs to bias said spreader strips to engage and conform to the shape of the inside of the sleeve, by the stored-up energy in said springs.

2. A sleeve spreader and shaper in accordance with claim 1,
wherein the resilient plastic material is a chlorinated polyvinyl chloride and the spreader strips are in tubular form.

3. A sleeve spreader and shaper in accordance with claim 1,
wherein the plastic material is polypropylene and
wherein the sleeve conforming strips are tubular in form.

4. In a coat sleeve spreader and shaper,
a pair of laterally spaced resilient sleeve conforming spreader strips,
an elongated stretch bar, longer than the lengths of said sleeve conforming spreader strips,
means spacing said spreader strips from opposite sides of said spacer bar and laterally extending and contracting said spreader strips relative to said spacer bar comprising:
a pair of bowed springs,
means securing said spreader strips to the convex portions of said bowed springs intermediate the ends of said spreader strips,
pivot means pivotally securing the ends of said bowed springs together,
one of said pivot means pivotally securing the inner ends of said bowed springs to one end of said stretch bar,
a second of said securing means slidably securing said bowed springs to said stretch bar, and
manually operable means connected between said stretch bar and the second of said pivot means for compressing said springs and contracting said sleeve conforming spreader strips.

5. A coat sleeve spreader and shaper in accordance with claim 4,
wherein the resilient sleeve conforming spreader strips are made from a tubular chlorinated polyvinyl chloride material.

6. A coat sleeve spreader and shaper in accordance with claim 4,
wherein the resilient sleeve conforming strips are made from a tubular polypropylene material.

7. A coat sleeve spreader and shaper in accordance with claim 4,
wherein the mannually operable means comprises a link and leverage arrangement pivotally connected between said stretch bar and the adjacent pivotally connected ends of said bowed springs and operable by the use of a single hand, to elongate and compress said bowed springs and contract said spreader strips relative to said stretch bar.

8. A coat sleeve spreader and shaper in accordance with claim 4,
wherein the manually operable means comprises a lever pivoted to said stretch bar adjacent the outer end thereof, a link pivoted to the end of said lever and having pivotal connection with the adjacent ends of said bowed springs, to compress said bowed springs and contract said spreader strips, upon movement of said link and lever toward said stretch bar.

9. A coat sleeve spreader and shaper in accordance with claim 8,
wherein a slot extends along stretch bar, and
wherein a pivot pin forms a slidable guide for said bowed springs along said slot, and forms pivotal connecting means for said link to said bowed springs.

10. A coat sleeve shaper in accordance with claim 7,
wherein a slide is mounted on said stretch bar for movement therealong,
wherein the other of said pivot means pivotally connects the adjacent outer ends of said bowed springs to said slide,
wherein the lever is pivotally connected to said stretch bar, and
wherein the link is pivotally connected to said slide, to effect movement of said slide outwardly of said stretch bar upon the grasping of said link and lever and moving said link and lever toward said slide.

References Cited
UNITED STATES PATENTS

| | | | |
|---|---|---|---|
| 2,034,130 | 3/1936 | Boyle | 223—63 |
| 3,174,663 | 3/1965 | Campbell | 223—63 X |
| 3,202,329 | 8/1965 | Schmidt | 223—85 |

MELVIN STEIN, Primary Examiner

G. V. LARKIN, Assistant Examiner